United States Patent [19]

Suzuki et al.

[11] Patent Number: 4,716,951
[45] Date of Patent: Jan. 5, 1988

[54] PNEUMATIC TIRE

[75] Inventors: Tatsuo Suzuki, Kanagawa; Ken Takahashi, Chigasaki; Kazuyuki Kabe, Hiratsuka; Yukio Kaga, Atsugi, all of Japan

[73] Assignee: The Yokohama Rubber Co., Ltd., Tokyo, Japan

[21] Appl. No.: 895,571

[22] Filed: Aug. 12, 1986

Related U.S. Application Data

[63] Continuation of Ser. No. 561,239, Dec. 14, 1983, abandoned.

[51] Int. Cl.⁴ .......................... B60C 9/04; B60C 9/18
[52] U.S. Cl. .................................. 152/535; 152/548; 152/558; 152/561
[58] Field of Search ............... 152/526, 527, 528, 529, 152/534, 535, 548, 556, 560, 561, 558, 559

[56] References Cited

U.S. PATENT DOCUMENTS

| | | | |
|---|---|---|---|
| 3,896,869 | 7/1975 | Fujishima et al. | 152/361 R |
| 4,446,905 | 5/1984 | Tamura et al. | 152/361 R |
| 4,469,158 | 9/1984 | Kabe et al. | 152/361 R |

FOREIGN PATENT DOCUMENTS

| | | | |
|---|---|---|---|
| 1395033 | 3/1965 | France | 152/361 R |
| 102705 | 8/1980 | Japan | 152/361 R |

Primary Examiner—Donald E. Czaja
Assistant Examiner—Ramon R. Hoch
Attorney, Agent, or Firm—Finnegan, Henderson, Farabow, Garrett & Dunner

[57] ABSTRACT

In a pneumatic tire of a structure in which a belt-reinforcing layer is overlaid and interposed between a tread and a carcass cord layer, the belt-reinforcing layer consisting of a transient-reinforcing layer positioned in contact with the carcass cord layer with its reinforcing cords disposed at an angle of between 40° to 75° with respect to the circumferential direction of the tire, and at least two belt-resistant layers, the lower one thereof being laid over the transient-reinforcing layer with its reinforcing cords disposed at an angle of between 15° to 30° with respect to the circumferential direction of the tire, and the upper one with its reinforcing cords disposed at an angle of between 150° to 165° thereto, the tire is improved in that the carcass cord layer is formed of a single layer and the reinforcing cords in the carcass cord layer are arranged so that their angle with respect to the circumferential direction of the tire is between 75° to 85° when measured from the side on which the angle of the reinforcing cords in the transient-reinforcing layer is an acute angle with respect to the circumferential direction of the tire.

3 Claims, 9 Drawing Figures

PNEUMATIC TIRE

This application is a continuation of application Ser. No. 561,239, filed Dec. 14, 1983, now abandoned.

BACKGROUND OF THE INVENTION

1. Field of the Invention

This invention relates to a pneumatic tire, and more particularly to a pneumatic tire in which the structure of the carcass cord layer is improved to minimize partial or biased wear of the tire while improving its straight running stability, by reducing the ply steer in a radial tire for truck and bus or for small truck in which a belt-reinforcing layer consisting of a transient-reinforcing layer and at least two belt tension-resistant layers is overlaid and interposed between a tread and a carcass cord layer.

2. Description of Prior Art

A conventional radial tire for truck and bus or for small truck has a construction in which, as illustrated in FIG. 3 of the accompanying drawings, a belt-reinforcing layer is overlaid and interposed between a tread and a carcass cord layer, the belt-reinforcing layer consisting of a transient-reinforcing layer positioned in contact with the carcass cord layer with its reinforcing cords disposed at an angle of between 40° to 75° with respect to the circumferential direction of the tire, and at least two belt tension-resistant layers in which the reinforcing cords are disposed at angles of between 15° to 30° and 150° to 165°, respectively, with respect to the circumferential direction of the tire so as to cross each other, and the carcass cord layer consists of one or more layers in which the reinforcing cords are arranged at an angle of about 90° with respect to the circumferential direction of the tire. A radial tire of this kind is superior to a bias tire in brake performance, low fuel consumption, and wear resistance, thanks to the belt-reinforcing layer; but the problem with such a radial tire is that its straight running stability is poor because of the belt-reinforcing layer. As the radial tire rotates and moves forward, a lateral force occurs either to the right or left of the forward direction, even if the slip angle is zero. This lateral force makes the vehicle move in a direction different to that chosen by the driver.

In general, the lateral force when the slip angle is zero consists of force components generated by two different mechanisms, one is referred to as "conicity" (CT) and the other "ply steer"0 (PS). They are classified as part of the uniformity characteristics of the tire. The conicity CT and ply steer PS can be expressed by the following formulas, from their definition in accordance with the uniformity testing method (JASO C607) for car tires:

$$LFDw = PS + CT \quad (1)$$

$$LFDs = PS - CT \quad (2)$$

where LFD is the mean value of the lateral forces experienced while the tire rotates once, LFDw is the mean value measured at the outer side of the tire, and LFDs is the mean value measured when the tire is turned inside out. PS and CT can be given as follows from formulae (1) and (2):

$$CT = \tfrac{1}{2}(LFDw - LFDs) \quad (3)$$

$$PS = \tfrac{1}{2}(LFDw + LFDs) \quad (4)$$

The relationships of formulas (1) through (4) can be illustrated diagrammatically as in FIG. 1.

Of the conicity and ply steer described above, conicity is believed to be a force generated because the tire shape is geometrically asymmetric about the center of the circumferential direction of the tire, that is, a force generated when a tire in the shape of a truncated cone rolls. The main reason for the generation of this force is the influence of the positions of belt-reinforcing layers inserted into the tread of the tire. Hence the force can be reduced by improving the manufacture procedure. In contrast, ply steer is a force inherent to and arising from the structure of the belt-reinforcing layers themselves, and hence can not be reduced much in practice unless the structure of the belt-reinforcing layers is changed.

Now, let us consider a belt-reinforcing layer. It can be represented as a three-layer laminated sheet 50 consisting of two belt tension-resistant layers 50u, 50d and a belt-strengthening layer 50s, as shown in FIG. 2(A). It is well known that when a tensile force acts upon this three-layer laminated sheet 50 in the circumferential direction EE' of the tire, the three-layer laminated sheet 50 undergoes deformation, not only in the two-dimensional plane in which the tensile force acts, but also three-dimensionally outside the plane, so that torsional deformation like that shown in FIG. 2(B) occurs. The ply steer mentioned above occurs because of the torsional deformation of the belt-reinforcing layers.

In the past, various studies have been done to determine whether this ply steer could be reduced by adding an extra belt-reinforcing layer or layers to the existing belt-reinforcing layers. The addition of extra belt-reinforcing layers is not preferable because it would adversely affect the characteristics of the radial tire such as its low fuel consumption characteristics.

SUMMARY OF THE INVENTION

An object of this invention is to provide a pneumatic tire in which the problems described above concerning conventional radial tires for truck and bus or for small truck, especially those with a single carcass cord layer, are eliminated, and which has a better straight running stability and partial wear resistance than conventional radial tires, by reducing the ply steer by a novel arrangement of the reinforcing cords in the carcass cord layer, without adding any extra belt-reinforcing layer.

In a pneumatic tire of the type in which a belt-reinforcing layer is overlaid and interposed between a tread and a carcass cord layer, the belt-reinforcing layer consisting of a transient-reinforcing layer positioned in contact with the carcass cord layer with its reinforcing cords disposed at an angle of between 40° to 75° with respect to the circumferential direction of the tire, and at least two belt tension-resistant layers, the lower one thereof laid over the transient-reinforcing layer with its reinforcing cords disposed at an angle of between 15° to 30° with respect to the circumferential direction of the tire, and the upper one with its reinforcing cords disposed at an angle of between 150° to 165° with respect to the circumferential direction of the tire, the pneumatic tire achieving the object of this invention is characterized in that the carcass cord layer consists of a single layer, and the reinforcing cords in the carcass cord layer are arranged so that they make an angle of between 75° to 85° with respect to the circumferential direction of the tire when measured from the side on which the angle made by the reinforcing cords in the transient-reinforcing layer in contact with the carcass cord layer is an acute angle with respect to the circumferential direction of the tire.

DESCRIPTION OF THE PREFERRED EMBODIMENTS

Figure 1:
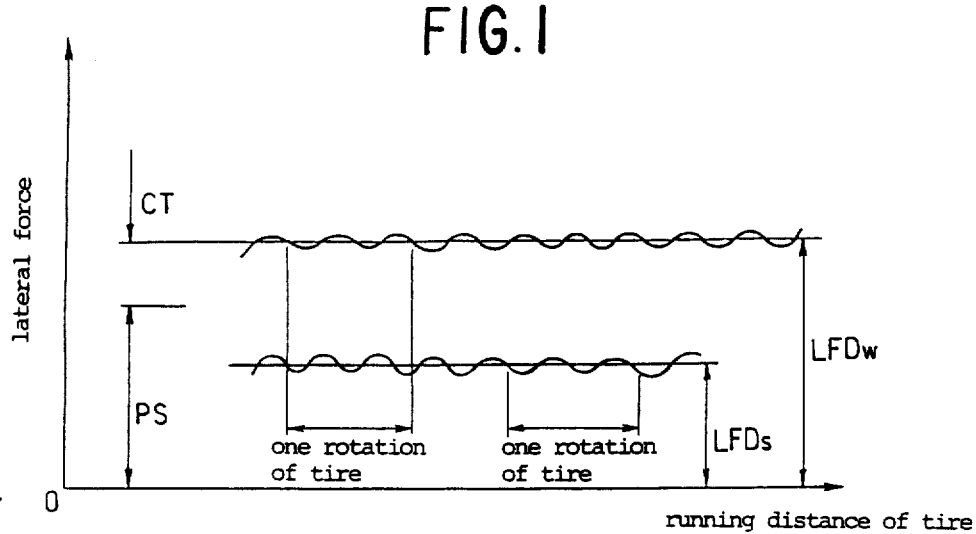
FIG. 1 is a graph of the relationship between the distance traveled by a radial tire and the lateral force thereon.
Figure 2A:
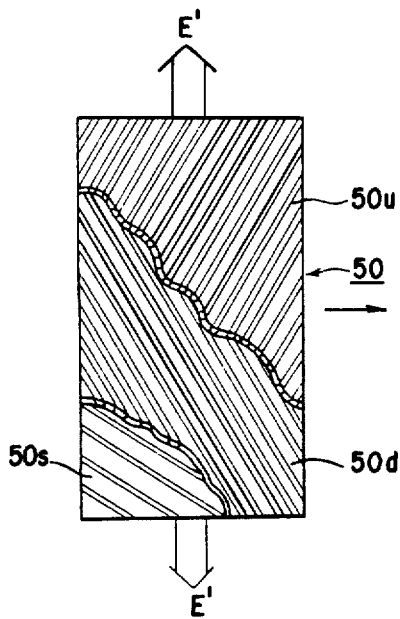
FIGS. 2 (A) and (B) are views of a model illustrating the deformation of a belt-reinforcing layer.
Figure 2B:
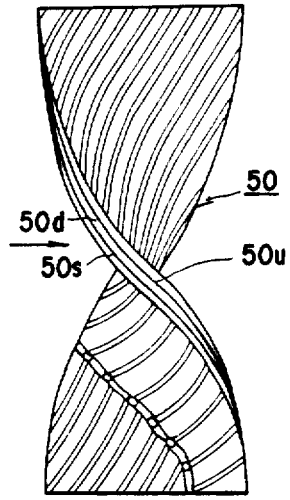
Figure 3:
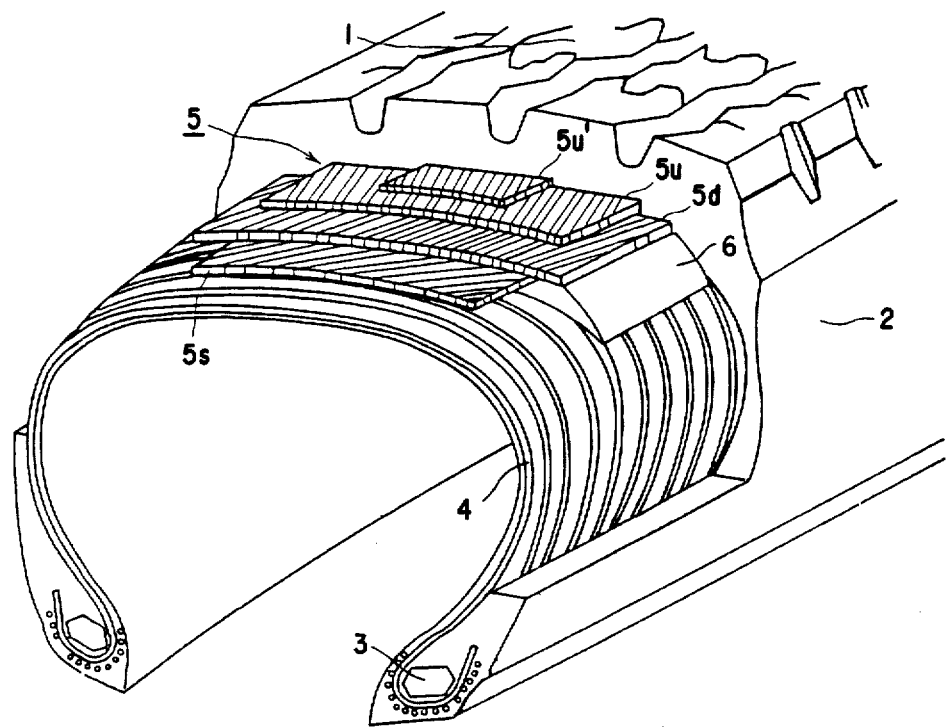
FIG. 3 is perspective view of a section of a conventional radial tire.

Hereinafter, the present invention will be described with reference to the preferred embodiments thereof shown in the drawings.

Figure 4:
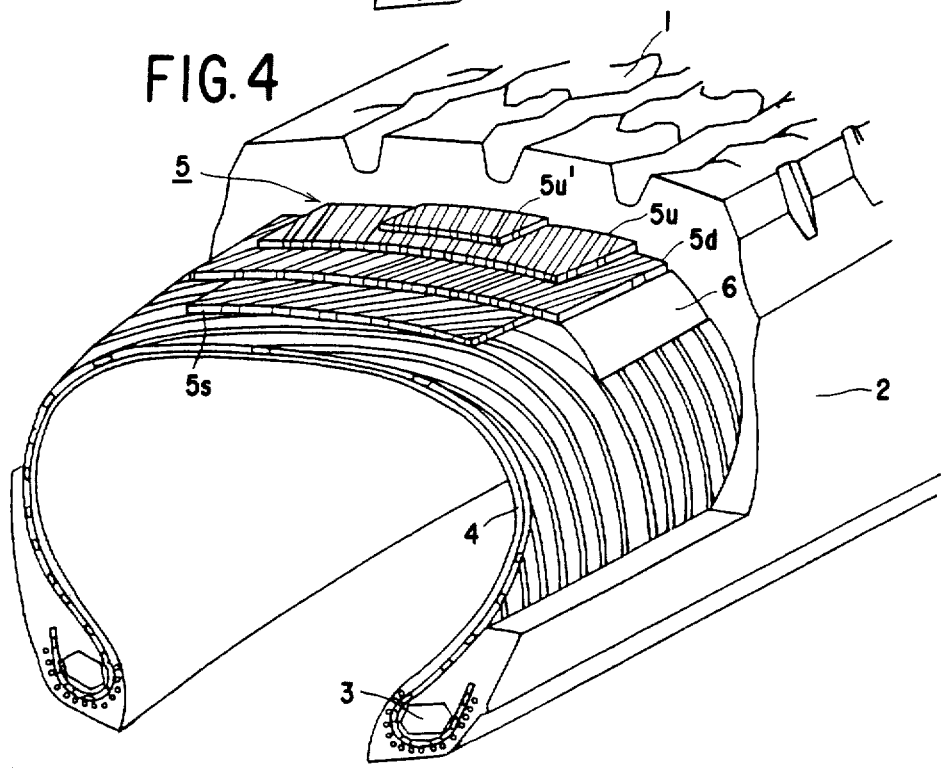
FIG. 4 is a perspective view of a section of the pneumatic tire in accordance with one embodiment of the present invention.
Figure 5:
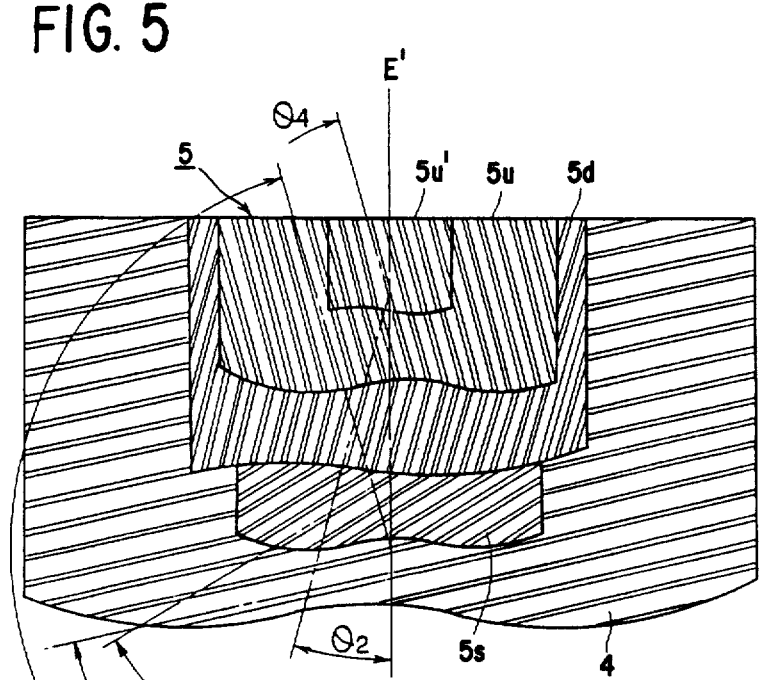
FIG. 5 is a developed plan view of the belt-reinforcing layers and carcass cord layer of the pneumatic tire of FIG. 4.

FIG. 4 is a perspective view of a section of the pneumatic tire in accordance with one embodiment of the present invention, and FIG. 5 is a developed plan view of the belt-reinforcing layer and carcass cord layer of the pneumatic tire.

In FIGS. 4 and 5, reference numeral 1 denotes a tread and reference numeral 2 side walls that are positioned so as to extend on both sides of the tread 1. Bead wires 3 are embedded in the lower edge portions of the side walls. A carcass cord layer 4 is positioned in such a manner that it wraps around the bead wires 3 at both edge portions thereof, and extends up the side walls 2 and over the inner surface of the tread 1. A belt-reinforcing layer 5 of steel cords is interposed between the carcass cord layer 4 and the tread 1. The carcass cord layer 4 is a single layer.

The belt-reinforcing layer 5 in this embodiment, as shown in FIGS. 4 and 5, has a four-layer laminated structure consisting of a transient-reinforcing layer 5s disposed adjacent to the carcass cord layer 4 and three (top, middle and bottom) belt tension-resistant layers 5u', 5u, 5d laid over the transient-reinforcing layer 5s.

Of the four layers that form the belt-reinforcing layer 5, the top and middle belt tension-resistant layers 5u' and 5u are arranged so that the angles $\theta_4$, $\theta_3$ of their respective reinforcing cords are between 150° to 165° with respect to the circumferential direction EE' of the tire, while the angle $\theta_2$ of the reinforcing cords in the bottom belt tension-resistant layer 5d is between 15° to 30°, and the reinforcing cords in the top and middle belt tension-resistant layers 5u', 5u and those in the bottom belt tension resistant layer 5d are arranged so as to cross each other.

The reinforcing cords of the transient-reinforcing layer 5s are at an angle $\theta_1$ of between 40° to 75° with respect to the circumferential direction EE' of the tire, and are arranged so as to lie in the same direction as those of the bottom belt tension-resistant layer 5d.

The structure of this belt-reinforcing layer 5 is same as that of a conventional radial tire.

The angle of the cords of the carcass cord layer 4 with respect to the circumferential direction of the tire is important in reducing ply steer, and the cords must be disposed so as to satisfy the following conditions.

Figure 6:
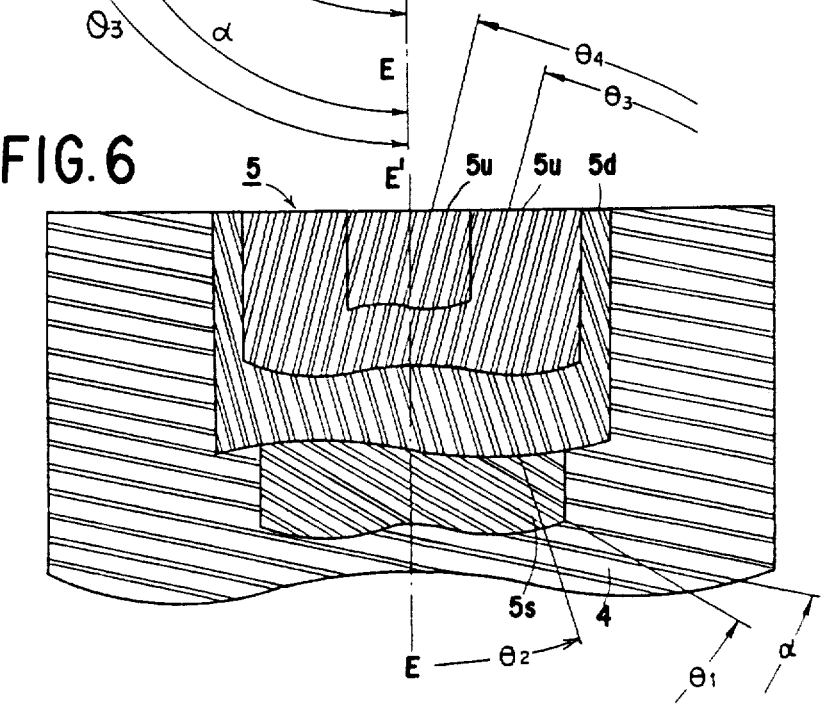
FIG. 6 is a similar developed plan view of the pneumatic tire in accordance with another embodiment of this invention.

That is to say, the cords of the carcass cord layer 4 must be arranged so that the angle $\alpha$ made by the cords with respect to the circumferential direction of the tire is between 75° to 85°, when measured from the side on which the reinforcing cords in the belt-strengthening layer 5s, in contact with the carcass cord layer 4, are at an acute angle with respect to the circumferential direction of the tire. Since the angle $\alpha$ is measured from the side on which the reinforcing cords in the transient-reinforcing layer 5s in contact with the carcass cord layer 4 are at an acute angle with respect to the circumferential direction EE' of the tire, as described above, when the reinforcing cords in the belt-reinforcing layer 5s are arranged to extend downward to the right, as in the embodiment shown in FIG. 6, the angle must be measured in the counterclockwise direction with respect to the circumferential direction EE' of the tire.

If the angle $\alpha$ of the cords in the carcass cord layer 4 is greater than 85°, ply steer can not be improved over that of conventional radial tires. If the angle $\alpha$ is less than 75°, though the ply steer can be improved to a certain extent, the load durability will get worse. The selection of the angle $\alpha$ to be between 75° to 85° can not only improve ply steer in comparison with conventional radial tires where $\alpha = 90°$, as said above, but can also realize an improvement in the straight running stability and a reduction of partial wear, thanks to the reduced ply steer.

In the pneumatic tire in the embodiment described above, the belt-reinforcing layer has a four-layer structure consisting of one transient-reinforcing layer and three belt tension-resistant layers, but it can be substituted by a belt-reinforcing layer of a three-layer structure consisting of one transient-reinforcing layer and two belt tension-resistant layers. It is also of course possible to employ a transient-reinforcing layer of a structure in which the transient-reinforcing layer is divided in two parts which are positioned at both shoulder portiosn of the tread, leaving out the central area thereof, or the belt-reinforcing layers of a conventional structure can be used.

The belt-reinforcing layer of the three-layer structure mentioned above may, for instance, be constructed such that the two belt tension-resistant layers are laid over the transient-reinforcing layer positioned in contact with the carcas cord layer, with the reinforcing cords in the transient-reinforcing layer and the lower belt tension-resistant layer arranged in the same direction, and those in the lower and upper belt tension-resistant layers in opposite directions. The angles of the reinforcing cords with respect to the circumferential direction of the tire is between 40° and 75° in the transient-reinforcing layer, between 15° and 30° in the lower belt tension-resistant layer, and between 150° and 165° in the upper belt tension-resistant layer.

Although steel cords are used in the belt-reinforcing layer in the embodiment described above, these steel cords may be replaced by cords made of the aromatic polyamide fiber with the tradename "Kevlar". The reinforcing cords in the carcass cord layer need not necessarily be steel cords; any suitable material with a high modulus of elasticity above $5 \times 10^3$ kg/mm$^2$ such as aromatic polyamide fibers may be used as these reinforcing cords.

In the drawings, reference numeral 6 designates a rubber belt cushion.

Hereinafter, the present invention will be described in further detail with reference to specific experimental examples.

EXPERIMENTAL EXAMPLE 1

Various pneumatic tires with the structures of belt-reinforcing layers and carcass cord layer shown in FIGS. 4 and 5 were produced in which the angle $\alpha$ of the cords in the carcass cord layer was varied. The angles of the reinforcing cords in the transient-reinforcing layer and the belt tension-resistant layers in the belt-reinforcing layer were as follows: $\theta_1 = 60°$, $\theta_2 = 18°$, and $\theta_3 = \theta_4 162°$. The tire size was 11R22.5-14PR and 8.25×22.5 rims were used.

The ply steer (PS) of each of these pneumatic tires was measured in accordance with the uniformity testing method JASO C607 for car tires, under the conditions of 2,450 kg loading and 7.25 kg/cm$^2$ air pressure in the tire. The results are shown in FIG. 7.

Figure 7:
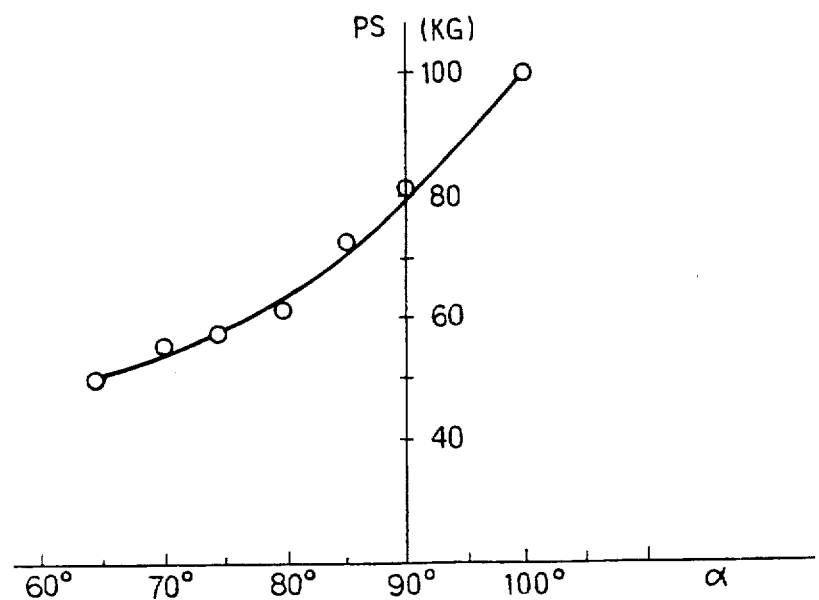
FIG. 7 is a graph of the relationship between ply steer and cord angle $\alpha$.

As is obvious from the graph of FIG. 7, the tires in which the angle $\alpha$ of the cords in the carcass cord layer was less than 85° had a smaller ply steer than that of the conventional radial tire in which $\alpha = 90°$. This indicates an improvement in the straight running stability of these tires.

EXPERIMENTAL EXAMPLE 2

The load durability of each of the pneumatic tires used in Experimental Example 1 was measured by using an indoor drum tester of a diameter of 1707 mm. Each tire was made to run with an air pressure of 7.25 kg/cm$^2$, a speed of 45 km/hr, and an initial loading of 2,700 kg. After a 2-hour preliminary run, the load was increased to 3,915 kg, and thereafter it was increased by 270 kg every 10 hours, the tires being allowed to run until they burst.

Figure 8:
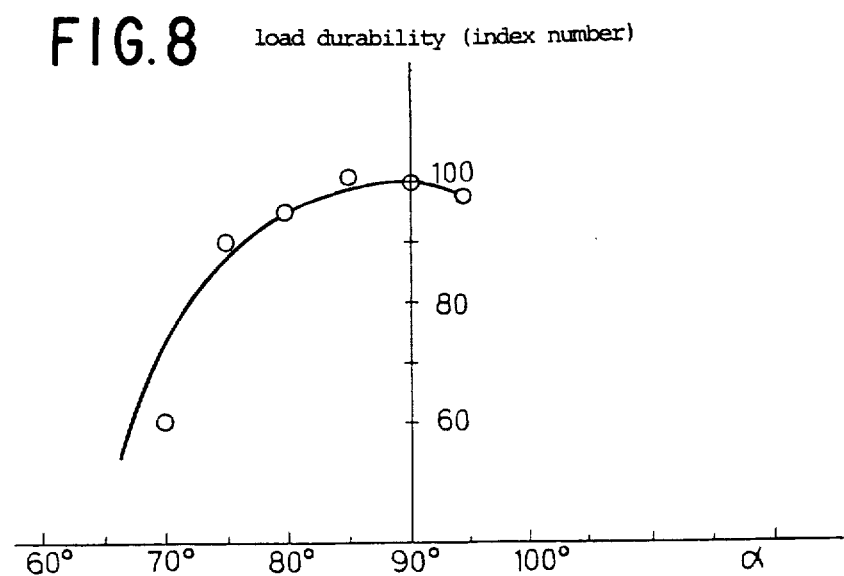
FIG. 8 is a graph of the relationship between load durability and cord angle $\alpha$.

The load at bursting was measured, and the results shown in FIG. 8 were obtained. The numerical values given in FIG. 8 are indices based on a value of 100 which represents the load at bursting of a conventional radial tire with $\alpha = 90°$.

As is obvious from the graph of FIG. 8, the load durability of the tire is reduced when the angle $\alpha$ of the cords in the carcass cord layer is less than 75°.

As described above, in a pneumatic tire of the type in which a belt-reinforcing layer is overlaid and interposed between a tread and a carcass cord layer, the belt-reinforcing layer consisting of a transient-reinforcing layer placed in contact with the carcass cord layer with the reinforcing cords therein disposed at an angle of between 40° to 75° with respect to the circumferential direction of the tire, and at least two belt tension-resistant layers, the lower one thereof being laid over the transient-reinforcing layer with the reinforcing cords therein disposed at an angle of between 15° to 30° with respect to the circumferential direction of the tire, and the upper one with the reinforcing cords therein disposed at an angle of between 150° to 165°, the pneumatic tire in accordance with the present invention has a construction in which the carcass cord layer is formed as a single layer, and the reinforcing cords in the carcass cord layer are arranged such that the angle thereof with respect to the circumferential direction of the tire is between 75° to 85° when measured from the side on which the angle of the reinforcing cords in the transient-reinforcing layer is an acute angle with respect to the circumferential direction of the tire. With this construction, it is possible to reduce the ply steer due to the belt-reinforcing layer to less than that of a conventional radial tire, and also greatly improve the tires straight running stability as well as its resistance to partial wear.

What is claimed is:

1. A pneumatic tire having a thread comprising a carcass cord layer containing reinforcing cords and a belt-reinforcing layer overlaid and interposed between the tread of the tire and the carcass cord layer, said belt reinforcing layer including a transient-reinforcing layer having reinforcing cords positioned in contact with said carcass cord layer with the reinforcing cords therein disposed at an angle of between 40° to 75° with respect to the circumferential direction of the tire, and at least two belt tension-resistant layers having reinforcing cords, the lower one thereof being laid over said transient-reinforcing layer with the reinforcing cords therein disposed at an angle of between 15° to 30° with respect to the circumferential direction of the tire and the upper one with the reinforcing cords therein disposed at an angle of between 150° to 165° thereto, said cords of said carcass cord layer, said transient-reinforcing layer and said lower tension-resistant layer being oriented in the same direction and said carcass cord layer being a single layer, in which the reinforcing cords therein have an elasticity of at least $5 \times 10^3$ Kg/mm$^2$ and are disposed at an angle of between 75° to 85° with respect to the circumferential direction of the tire, all angles being measured from the same side of the tire, the side being the side on which the angle of the reinforcing cords in the transient-reinforcing layer is an acute angle with respect to the circumferential direction of the tire.

2. The tire of claim 1, wherein the reinforcing cords of the carcass cord layer are steel cords.

3. The tire of claim 1, wherein the reinforcing cords of the carcass cord layer are aromatic polyamide fibers.

* * * * *

UNITED STATES PATENT AND TRADEMARK OFFICE
CERTIFICATE OF CORRECTION

PATENT NO. : 4,716,951

DATED : January 5, 1988

INVENTOR(S) : Tatsuo SUZUKI, et al.

It is certified that error appears in the above-identified patent and that said Letters Patent is hereby corrected as shown below:

In Claim 1, Column 6, Line 24; change

"thread" should be --tread--

Signed and Sealed this

Seventh Day of June, 1988

Attest:

DONALD J. QUIGG

Attesting Officer     Commissioner of Patents and Trademarks